United States Patent [19]

Pers

[11] Patent Number: 4,765,704
[45] Date of Patent: Aug. 23, 1988

[54] APPARATUS FOR CENTERING OPTICAL FIBRES DURING WELDING

[75] Inventor: Karl O. Pers, Norsborg, Sweden

[73] Assignee: Telefonaktiebolaget L M Ericsson, Stockholm, Sweden

[21] Appl. No.: 901,128

[22] Filed: Aug. 28, 1986

[30] Foreign Application Priority Data

Sep. 13, 1985 [SE] Sweden ............................. 8504258

[51] Int. Cl.$^4$ ............................................... G02B 6/26
[52] U.S. Cl. ................................. 350/96.15; 350/96.21
[58] Field of Search ............... 350/96.15, 96.20, 96.21; 250/227; 219/121 P, 121 PA, 121 PB, 124.4

[56] References Cited

U.S. PATENT DOCUMENTS

| 4,270,839 | 6/1981 | Cross | 350/96.15 |
| 4,313,744 | 2/1982 | Toda | 350/96.21 X |
| 4,618,212 | 10/1986 | Ludington et al. | 350/96.15 X |
| 4,664,732 | 5/1987 | Campbell et al. | 350/96.15 X |
| 4,690,493 | 9/1987 | Khoe | 350/96.20 |

FOREIGN PATENT DOCUMENTS 0136761 2/1984 European Pat. Off.

Primary Examiner—John Lee
Assistant Examiner—Phan Heartney
Attorney, Agent, or Firm—Burns, Doane, Swecker & Mathis

[57] ABSTRACT

A first (1) and a second (4) optical fibre are each retained in its holder (2, 5) by which the ends of the fibres may be centered at a contact location (6). Each of the fibres is bent at a radius ($R_1$) dependent on the light wavelength in its respective light coupling means (8, 9) for coupling light to the fibres. Light from a light source (11) passes the contact location (6) and is measured with the aid of a light detector (14) and a measuring instrument (16). For each fibre (1, 4) the apparatus has a mode filter including a cylinder (17, 18) about which the fibre is bent half a turn. This cylinder has a radius ($R_2$) which is greater than the cylinder radius ($R_1$) in the light coupling means. A light signal ($I_1$) has a basic mode ($I_2$) with symmetric energy distribution, which passes through the first mode filter (17), while higher order unsymmetric modes ($I'_1$) are filtered away. A light signal ($I_3$) in the second fibre (4) has higher order modes ($I'_3$) generated at the contact location, these modes being filtered away in the second mode filter (18), so that a light signal ($I_4$) with only basic modes actuates the detector (14). A splice with low signal attenuation may be obtained by only using the symmetric basic mode during detection of the fibre centering.

4 Claims, 2 Drawing Sheets

APPARATUS FOR CENTERING OPTICAL FIBRES DURING WELDING

TECHNICAL FIELD

The invention relates to an apparatus for centering optical fibres during welding, and including a holder for a first and a holder for a second optical fibre, with the aid of which the ends of the fibres can be mutually centered at a contact location, light coupling means for coupling light of a desired wavelength through the cladding of the first fibre and coupling light of this wavelength out through the cladding of the second fibre, where the optical fibre can be kept bent in the light coupling means with a radius dependent on said wavelength, so that light can be sent through the contact location for the fibres to enable optical detection whether the fibres have concentric cores.

BACKGROUND ART

Splicing optical fibres is often made more difficult by the fibre core not lying centrically in the fibre cladding. In such a case, when two fibre ends which are centered starting from the outer surface of the cladding are welded together, the cores will be displaced in relation to each other, resulting in that the splice heavily attenuates a transmitted light signal. This problem is particularly evident in so-called single mode fibres which have a very narrow core and a comparatively very heavy cladding. To enable good centering, a light signal may be sent from one fibre through the contact location of the fibres to the other fibre where the light signal is detected as described, for example, in the British patent application No. 2115948. This publication describes an apparatus where the fibre is bent with a small radius of curvature in the vicinity of the contact location, so that light may be coupled into and out from the fibre at the bent places. The apparatus has the disadvantage that the basic modes of the light as well as higher order modes are detected during the centering process. This can result in that the fibres are kept mutually laterally displaced in spite of the detection, so that an incorrect splice is obtained.

DISCLOSURE OF INVENTION

The problems mentioned above are solved by the invention with an apparatus where solely the basic light mode is detected. The apparatus is characterized as will be apparent from the accompanying claims.

BRIEF DESCRIPTION OF DRAWINGS

An embodiment of the invention will now be described below in connection with a drawing, where.

BEST MODE FOR CARRYING OUT THE INVENTION

Figure 1:
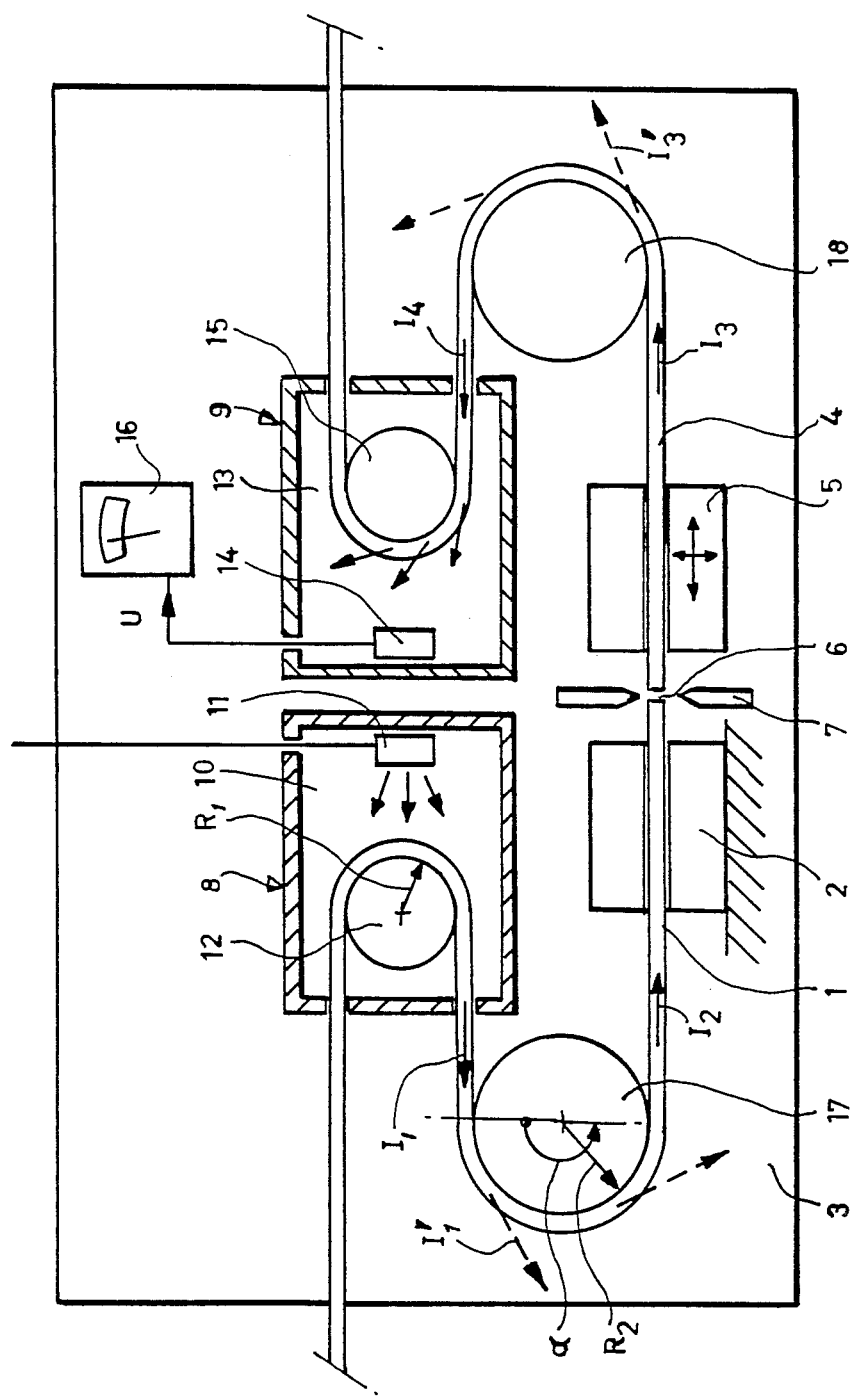
FIG. 1 illustrates an inventive apparatus for centering optical fibres.

An inventive apparatus is illustrated in FIG. 1, for centering two optical fibres which are to be welded together. A first optical fibre 1 is retained at tone end by a holder 2. This holder is fixed in relation to a base 3, which is indicated in the figure by hatching under the holder 2. A second optical fibre 4 is retained at one end by a holder 5. This holder is movable in relation to the base 3, which is indicated in the figure by two crossing arrows on the holder. The holder 5 may be displaced three-dimensionally so that the ends of the fibres 1 and 4 may be moved towards and relative each other, for centering at a contact location 6. When the centered position has been attained, the fibres are welded together with the aid of electrodes 7. The latter are connected in an unillustrated way to a voltage source, so that an electric arc occurs between the electrodes, which fuses the ends of both fibres together.

The optical fibres for which the inventive apparatus is primarily intended are envisaged as so-called single mode fibres which have a very narrow core. As an example may be mentioned that single mode fibres intended for the wavelength $\lambda = 1,3$ $\mu$m have a core diameter of about 8 $\mu$m, which is to be compared with multimode fibres with a core diameter in the order of magnitude of 100 $\mu$m. In welding single mode fibres there is a severe requirement that the fibre ends arae mutually well-centered in order that a welded splice with small signal attenuation shall be obtained. This desired good centering may be obtained by light being sent from the first fibre 1 through the contact location 6 to the second fibre 4, in which the light strength is measured. For practical reasons, it is desirable to couple light into and out from the fibres in the vicinity of the contact location. For this purpose, the apparatus in FIG. 1 has light coupling means 8 and 9 of a known kind. The means 8 for coupling light into the fibre 1 includes a chamber 10 with a light source 11, e.g. a light emitting diode (LED) and a cylinder 12 about which the fibre is bent. The means 9 for coupling light out of the fibre 4 includes a chamber 13 with a light detector 14 and a cylinder 15, about which the fibre is bent. The cylinders 12 and 15 have a radius $R_1$ which must be selected large enough for the fibres not to be damaged by this bending. On the other hand, the radius $R_1$ must be selected sufficiently small so that a sufficient amount of light can be coupled into the fibre 1 and out of the fibre 4. In laboratory trials it has been found that a suitable balance here is for the radius $R_1$ to be in the interval 2 to 4 mm and preferably with $R_1 = 3.0$ mm for the single mode fibre exemplified above, with the core diameter d $= 8$ $\mu$m. The light detector 14 sends an electric signal U to a measuring instrument 16, the value of the signal U varying when the ends of fibres 1 and 4 are displaced in relation to each other as described above. When this signal reaches its maximum value, the ends of the fibres 1 and 4 are welded together at the contact location 6.

Figure 2:
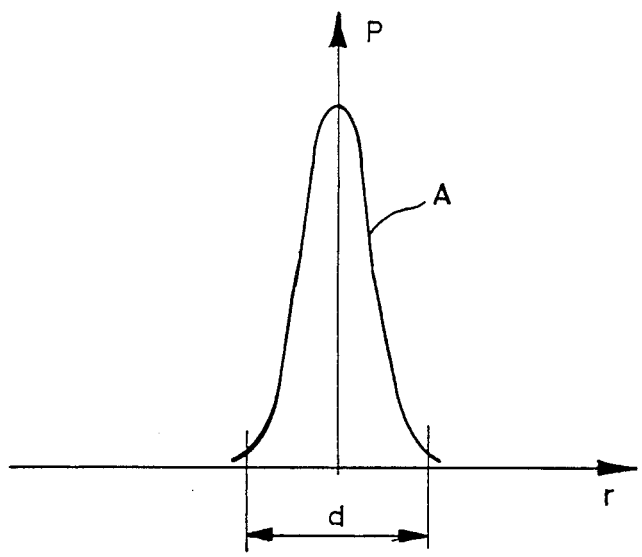
FIG. 2 is a diagram showning the energy distribution of the basic light mode in an optical single mode fibre and FIG. 3 is a diagram showing an energy distribution in a fibre where both the basic mode and a second order mode co-exist.
Figure 3:
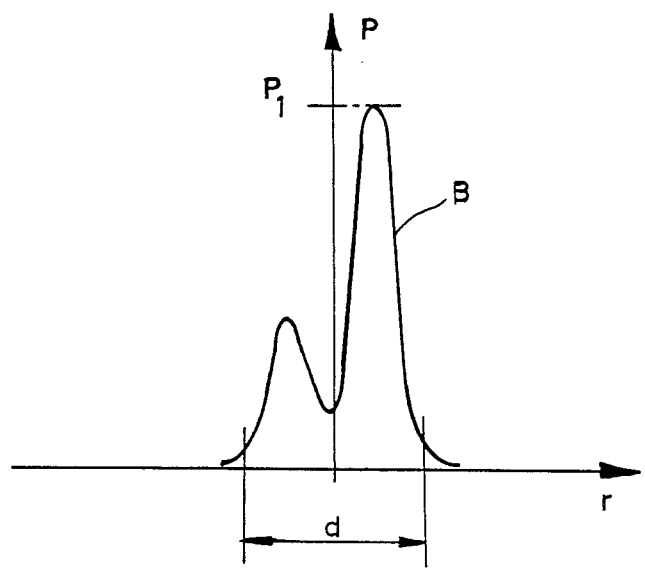

The single mode fibre exemplified above, with the core diameter $d = 8$ $\mu$m is intended for light with the wavelength $\lambda = 1,3$ $\mu$m, as mentioned. Only the basic mode of the light can exist in the fibre at this wavelength. A graph A in FIG. 2 shows how the light energy for this basic mode is symmetrically distributed over the cross section of the fibre. In the figure, P denotes the energy level, r denotes the position along a diameter of the fibre and d is the fibre core diameter according to the above. However, light with the wavelength $\lambda = 1,3$ $\mu$m is difficult to couple into the fibre with the light coupling means 8 described above. The signal reaching the measuring instrument 16 via the light coupling means 9 is therefore very weak. In addition, available detectors for light with the wavelength $\lambda=1,3$ μm emit themselves a rather heavy noise signal, which interferes with the measurement. These mentioned drawbacks may be avoided by using light with a shorter wavelength, preferably light with wavelengths $\lambda$ within the interval of 0,7 to 0,9 μm. Using the light coupling means 8 and 9 illustrated in FIG. 1, light with this shorter wavelength is easy to couple into, and out from, a fibre. The light source 11 is adapted for this shorter wavelength, so that a powerful light signal $I_1$ is obtained in the fibre 1. A relatively powerful light signal $I_4$ in the fibre 2 reaches the light coupling means 9, which couples out a large part of the light signal to the light detector 14. This detector, which is adapted for the wavelength $\lambda=0,85$ μm, has a low noise level, wich in combination with the good light power, enables the signal U to be measured with good accuracy. The light wavelength $\lambda=0,85$ μm for the light signal $I_1$ is less than the wavelength $\lambda=1,3$ μm, to which the single mode fibres 1 and 4 aare adapted. This results in that the light signal $I_1$ may also contain higher order modes, as well as the basic mode. A graph B in FIG. 3 illustrates an example of the energy distribution over the cross section of the fibre where the basic mode and a second order mode exist simultaneously. In the graph, P denotes the energy level, r denotes the position along a diameter through the fibre and d the core diameter of the fibre. The graph B is asymmetrical and has its greatest value $P_1$ heavily laterally displaced in relation to the central axis of the fibre core. If light with this assymmetric energy distribution is used in centering the fibres 1 and 4, a maximum light energy flux will be passed through the contact location 6 when the cores of the two fibres 1 and 4 are mutually, laterally displaced. This results in that the signal U is given a maximum value when the fibre cores are mutually laterally displaced, so that an incorrect fibre splice with high attenuation of the basic mode according to FIG. 2 is obtained. To avoid this incorrect splice of the fibres, the apparatus in FIG. 1 has mode filters in accordance with the invention. These include a cylinder 17, about which the fibre 1 is bent, and a cylinder 18 about which the fibre 4 is bent. The cylinders have a radius $R_2$ which is greater than the radius $R_1$ for the cylinders of the light coupling means 8 and 9. The radius $R_2$ is selected such that the basic mode of the light may be transported in the fibre past the mode filter while higher order modes are coupled out from the fibre. From calculations and laboratory experiments it has been found that a suitable value for the radius $R_2$ should be in the interval 4 to 6 mm, preferably with $R_2=5,0$ mm. This value of the radius $R_2$ is valid for the optical fibre with the core diameter $d=8,0$ μm with a light wavelength $\lambda=0,85$ μm. In order that the mode filter shall effectively filter away higher order modes, the fibres 1 and 4 must be bent round the cylinders 17 and 18, respectively, through a sufficiently large sector $\alpha$. However, for practical reasons this sector must be limited, and a suitably adapted sector is half a turn, as is illustrated in FIG. 1. The mode filters work in the following manner. The light signal $I_1$ coupled into the fibre 1 by the light coupling means 8 contains both the basic mode and higher order modes. When the signal $I_1$ passes the mode filter 17, a signal $I'_1$ will be coupled out of the fibre 1, this signal substantially containing higher order modes. After the mode filter 17 there is a signal $I_2$ in the fibre 1, this signal mainly containing the basic mode of the light. When this signal passes the contact location 6 between the fibres 1 and 4, a redistribution of the light energy takes place, so that a signal $I_3$ in the fibre 4 contains both basic mode and higher order modes. When the signal $I_3$ passes the mode filter 18, a signal $I'_3$, substantially containing higher order modes will be coupled out of the fibre 4. After the mode filter 18 there is a signal $I_4$ substantially containing the basic mode in the fibre 4. This signal is coupled out of the fibre 4 and is measured as described above. The measuring value thus obtained is only dependent on the basic mode of the light in the fibres, and has its maximum value when the cores of the fibres 1 and 4 are concentric. When the ends of the fibres are welded together there is thus obtained a splice which attenuates the basic mode as little as possible.

I claim:

1. Apparatus for centering optical fibes during welding, and including a holder for a first and a holder for a second optical fibre, with the aid of which the ends of the fibres can be mutually centered at a contact location, light coupling means for coupling in light of a desired wavelength through the cladding of the first fibre to its core, and coupling light of this wavelength out from the core of the second fibre through its cladding, where the optical fibres can be kept bent in the light coupling means with a radius dependent on said wavelength, so that light can be sent through the contact location for the fibres to enable optical detection of whether the fibres have concentric cores, characterized in that a mode filter (17, 18) is arranged in at least one of the fibres (1, 4) between the contact location (6) and the light coupling means (8, 9), such that the optical fibres (1, 4) can be kept bent over a sector ($\alpha$) with a bending radius ($R_2$) exceeding said radius ($R_1$) which is dependent on the desired wavelength, whereby, of the light oscillation modes in the cores of the fibres (1, 4), the basic mode can pass the mode filter (17, 18) substantially unaffected, while higher order modes are coupled out of the fibres such that detection of the basic light mode is used for centering the fibre cores.

2. Apparatus as claimed in claim 1, in which said desired light wavelength is within an interval of 0.7 to 0.95 μm and the radius dependent on the wavelength is within an interval of 2 to 4 mm, characterized in that in the mode filter the radius of curvature ($R_2$) of the optical fibres is in an interval of 4 to 6 mm.

3. Apparatus as claimed in claim 1, characterized in that said sector ($\alpha$) within which the fibre may be kept bent is half of a complete circle.

4. Apparatus as claimed in 2, characterized in that said sector ($\alpha$) within which the fibre may be kept bent is half of a complete circle.

* * * * *